United States Patent
Shi et al.

(10) Patent No.: US 12,229,118 B2
(45) Date of Patent: Feb. 18, 2025

(54) METHOD, APPARATUS AND DEVICE FOR DATA SHUFFLING, COMPUTER-READABLE STORAGE MEDIUM AND PRODUCT

(71) Applicant: Beijing Volcano Engine Technology Co., Ltd., Beijing (CN)

(72) Inventors: Haiyang Shi, Los Angeles, CA (US); Hao Wang, Los Angeles, CA (US)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/742,351

(22) Filed: Jun. 13, 2024

(65) Prior Publication Data

US 2025/0028705 A1 Jan. 23, 2025

(30) Foreign Application Priority Data

Jul. 17, 2023 (CN) .......................... 202310879264.8

(51) Int. Cl.
G06F 16/23 (2019.01)
G06F 7/14 (2006.01)

(52) U.S. Cl.
CPC ............ G06F 16/2365 (2019.01); G06F 7/14 (2013.01)

(58) Field of Classification Search
CPC ..... G06F 16/2365; G06F 7/14; G06F 16/9024
See application file for complete search history.

(56) References Cited

U.S. PATENT DOCUMENTS 9,256,536 B2 * 2/2016 Park .................... G06F 12/0811
2006/0045108 A1 * 3/2006 Blackmore ......... H04L 67/1097
370/402

(Continued)

FOREIGN PATENT DOCUMENTS

CN 103647807 A 3/2014
CN 103902486 A 7/2017

OTHER PUBLICATIONS

B. Liu, F. Liu, N. Xiao and Z. Chen, "Accelerating Spark Shuffle with RDMA," 2018 IEEE International Conference on Networking, Architecture and Storage (NAS), Chongqing, China, 2018, pp. 1-7. (Year: 2018).*

(Continued)

*Primary Examiner* — Robert W Beausoliel, Jr.
*Assistant Examiner* — Susan F Rayyan
(74) *Attorney, Agent, or Firm* — Alleman Hall & Tuttle LLP (57) ABSTRACT

The embodiments of the disclosure provide a dada shuffling method, apparatus and device, a computer-readable storage medium and product. The method comprises: acquiring a data shuffling request; acquiring a shuffling request parameter linked list associated with the at least one data to be shuffled based on the data shuffling request; performing a merging operation on shuffling request parameters in the shuffling request parameter linked list according to the data amount of the data segment corresponding to the shuffling request parameter and memory buffer information to obtain at least one target request parameter; and caching the data to be shuffled corresponding to the at least one target request parameter to a predetermined remote direct memory access network card; and distributing respectively data segments associated with at least one data to be shuffled cached in the remote direct memory access network card to a target server of the data segment.

20 Claims, 5 Drawing Sheets

(56) References Cited

U.S. PATENT DOCUMENTS

| | | | |
|---|---|---|---|
| 2006/0045109 A1* | 3/2006 | Blackmore | H04L 69/32 370/402 |
| 2006/0075067 A1* | 4/2006 | Blackmore | H04L 69/16 709/217 |
| 2011/0313973 A1* | 12/2011 | Srivas | G06F 16/275 707/634 |
| 2015/0150018 A1* | 5/2015 | Hu | G06F 9/5072 718/103 |
| 2015/0281126 A1 | 10/2015 | Regula et al. | |
| 2020/0133533 A1* | 4/2020 | Zhao | G06F 3/0653 |
| 2020/0202197 A1* | 6/2020 | Subhaschandra Banakar | G06F 18/217 |
| 2020/0341764 A1 | 10/2020 | Jacob et al. | |
| 2022/0164122 A1* | 5/2022 | Zou | G06F 3/0647 |
| 2023/0125593 A1* | 4/2023 | Mahony | G06F 21/64 726/26 |
| 2023/0244629 A1* | 8/2023 | Marcovitch | G06F 13/42 710/105 |

OTHER PUBLICATIONS

European Patent Office, Extended European Search Report Issued in Application No. 24181560.4, Nov. 28, 2024, 10 pages.

* cited by examiner

METHOD, APPARATUS AND DEVICE FOR DATA SHUFFLING, COMPUTER-READABLE STORAGE MEDIUM AND PRODUCT

CROSS-REFERENCE

The present application claims priority to Chinese Patent Application No. 202310879264.8, filed on Jul. 17, 2023 and entitled "METHOD, APPARATUS, AND DEVICE FOR DATA SHUFFLING, COMPUTER READABLE STORAGE MEDIUM AND PRODUCT", the entirety of which is incorporated herein by reference.

FIELD

The present disclosed embodiments relate to the field of computer and network communication technologies, and in particular to a method, an apparatus, and a device for data shuffling, computer readable storage medium, and a product.

BACKGROUND

With the large-scale deployment of new-generation network elements in data centers, it has become an emerging key technology to utilize networks with high performance and low latency to reduce the overhead of data movement in parallel database systems. Currently, data shuffling operations are generally implemented based on performance and feature advantages of Remote Direct Memory Access (RDMA).

In the process of adopting RDMA for data shuffling, it is generally necessary to serialize the formatted data in the host memory and then copy the data to a plurality of buffers registered by RDMA network card according to shuffling segmentation rules, wherein each buffer corresponds to a target server, and when the data in the buffer reaches a certain threshold, a data shuffling engine hands the entire buffer to the RDMA network card for data transmission.

However, when adopting the above method to perform data shuffling, it is required to perform a large amount of data copying operations before sending the data to the RDMA network card, which often has a negative impact on the performance of the CPU. Moreover, as the network card bandwidth continuously increases, the CPU resources consumed by memory copying are increasing, which further affects the performance of the CPU.

SUMMARY

Embodiments of the present disclosure provide a method, an apparatus, and a device for data shuffling, a computer readable storage medium, and a product, which are used to solve a technical problem that the current method for dada shuffling has a negative impact on the CPU's performance.

In a first aspect, the embodiments of the present disclosure provide a method for data shuffling, comprising:
acquiring a data shuffling request for distributing at least one data to be shuffled pre-stored in a host memory to at least one target server, wherein the data to be shuffled comprises at least one data segment to be sent to different target servers;
acquiring a shuffling request parameter linked list associated with the at least one data to be shuffled based on the data shuffling request, wherein the shuffling request parameter linked list comprises at least one shuffling request parameter corresponding to the at least one data segment, and the shuffling request parameter comprises associated information of a target server to which the data segment is to be sent and memory buffer information corresponding to the data segment;
performing a merging operation on shuffling request parameters in the shuffling request parameter linked list according to the data amount of the data segment corresponding to the shuffling request parameter and the memory buffer information, to obtain at least one target request parameter composed of at least one shuffling request parameter; and caching the data to be shuffled corresponding to the at least one target request parameter to a predetermined remote direct memory access network card;
distributing respectively data segments associated with at least one data to be shuffled cached in the remote direct memory access network card to the target server indicated in the shuffling request parameter associated with the data segment.

In a second aspect, the embodiments of the present disclosure provide an apparatus for data shuffling, comprising:
an acquisition module configured to acquire a data shuffling request for distributing at least one data to be shuffled pre-stored in a host memory to at least one target server, wherein the data to be shuffled comprises at least one data segment to be sent to different target servers;
a linked list acquisition module configured to acquire a shuffling request parameter linked list associated with the at least one data to be shuffled based on the data shuffling request, wherein the shuffling request parameter linked list comprises at least one shuffling request parameter corresponding to the at least one data segment, and the shuffling request parameter comprises associated information of a target server to which the data segment is to be sent and memory buffer information corresponding to the data segment;
a cache module configured to perform a merging operation on shuffling request parameters in the shuffling request parameter linked list according to the data amount of the data segment corresponding to the shuffling request parameter and the memory buffer information, obtain at least one target request parameter composed of at least one shuffling request parameter, and to cache the data to be shuffled corresponding to the at least one target request parameter to a predetermined remote direct memory access network card;
a sending module configured to distribute respectively data segments associated with at least one data to be shuffled cached in the remote direct memory access network card to the target server indicated in the shuffling request parameter associated with the data segment.

In a third aspect, the embodiments of the present disclosure provide an electronic device, comprising a processor and a memory;
the memory is configured to store computer-executable instructions;
when executing the computer-executable instructions stored in the memory, the processor causes the at least one processor to execute the method for data shuffling as described in the first aspect and various possible designs of the first aspect.

In a fourth aspect, the embodiments of the present disclosure provide a computer-readable storage medium, wherein the computer-readable storage medium stores computer-executable instructions which, when executed by a processor, carry out the method for data shuffling as described in the first aspect and various possible designs of the first aspect.

In a fifth aspect, the embodiments of the present disclosure provide a computer program product, comprising a computer program which, when executed by a processor, carries out the method for data shuffling as described in the first aspect and various possible designs of the first aspect.

The dada shuffling method, apparatus and device, and a computer-readable storage medium and product provided by the present embodiments generate a shuffling request parameter linked list based on at least one data to be shuffled in the host memory, wherein the data to be shuffled comprises at least one data segment, each data segment corresponds to a shuffling request parameter, and the shuffling request parameter linked list is composed of the shuffling request parameters corresponding to each data segment. An optimizing operation is performed on shuffling request parameters in the shuffling request parameter linked list according to the data amount of the data segment corresponding to the shuffling request parameter and the memory buffer information, to obtain at least one target request parameter, wherein the target request parameter is composed of at least one shuffling request parameter, so that at least one data to be shuffled can be directly cached to the remote direct memory access network card based on the at least one target request parameter. By performing the optimizing operation on the shuffling request parameters, it is possible to send data corresponding to the merged shuffling request parameters at one time and to enable large-granularity DMA read and write to fully utilize PCIe performance. In addition, unlike the existing methods for data shuffling, the above method does not require a large number of memory copying operations for data shuffling, which effectively avoids the consumption of a large amount of CPU resources and avoids any impact on CPU's performance.

BRIEF DESCRIPTION OF THE DRAWINGS

In order to more clearly illustrate the embodiments of the present disclosure or the technical solutions in the prior art, the drawings required for use in the embodiments or the description of the prior art will be briefly introduced below. Obviously, the drawings described below are some embodiments of the present disclosure. For ordinary technicians in the art, other drawings may be acquired based on these drawings without paying any creative labor.

DETAILED DESCRIPTION

In order to make the objective, technical solution and advantages of the embodiments of the present disclosure clearer, the technical solutions in the embodiments of the present disclosure will be clearly and completely described below in conjunction with the drawings in the embodiments of the present disclosure. Obviously, the described embodiments are part of the embodiments of the present disclosure, not all of the embodiments. Based on the embodiments in the present disclosure, all other embodiments acquired by ordinary technicians in the art without creative work are within the scope of protection of the present disclosure.

Glossary

Remote Direct Memory Access (RDMA) is a network communication protocol that was first used in the field of high-performance computing and has gradually become popular in data centers. RDMA allows user programs to bypass the operating system kernel (CPU) and directly interact with the network card for network communication, thereby providing high bandwidth and extremely low latency. Therefore, the working principle of RDMA network cards is that, compared with traditional TCP/IP network cards, RDMA network cards omit the participation of the kernel (CPU), and all data transmission goes directly from the application to the network card.

Direct Memory Access (DMA) is an important feature of all modern computers. It allows hardware devices of different speeds to communicate without relying on a large interrupt load of the CPU.

Data shuffling: a mechanism to redistribute data so that some data are placed in the same partition.

The Central Processing Unit/Processor (CPU) is one of the main devices of an electronic computer and the core component of a computer. Its main function is to interpret computer instructions and process data in computer software. All operations in a computer are performed by the CPU, which is the core component responsible for reading instructions, decoding instructions and executing instructions.

In order to solve the technical problem that the current method for data shuffling has a negative impact on CPU's performance, the present disclosure provides a method for data shuffling, apparatus, device, computer-readable storage medium and product.

It should be noted that the method for data shuffling, apparatus, device, computer-readable storage medium and product according to the present disclosure may be applied to any RDMA-based data shuffling scenario.

Figure 1:
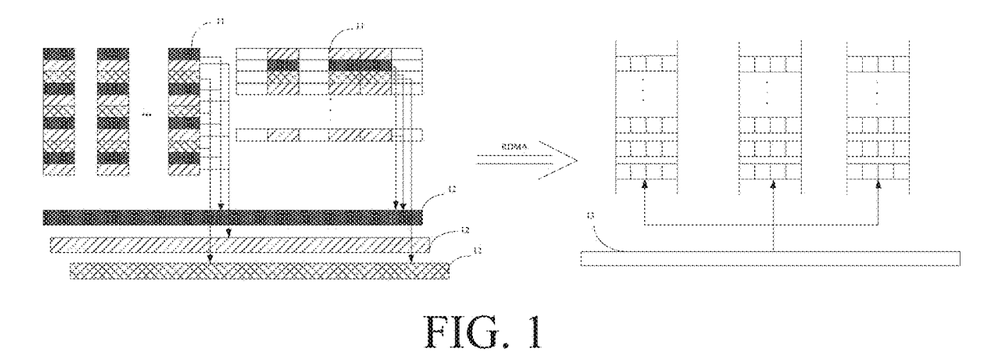
FIG. 1 is a schematic diagram of an application scenario of a general RDMA-accelerated method for data shuffling according to an embodiment of the present disclosure.

FIG. 1 is a schematic diagram of an application scenario of a general RDMA-accelerated method for data shuffling according to an embodiment of the present disclosure. As shown in FIG. 1, in the general RDMA-accelerated method for data shuffling, data 11 to be shuffled is generally read from a storage to a memory through Scanner of a predetermined query engine, wherein the data may be stored in a row format or a column format. A data shuffling engine may serialize the formatted data 11 and then copy the data to a plurality of buffers 12 registered by an RDMA network card according to shuffling segmentation rules, each of the buffers corresponding to a target server. When the data in the buffer reaches a certain threshold, the data shuffling engine hands the entire buffer to the RDMA network card for data transmission. When the data arrives at a receiving end 13, after descrialization and distribution, it participates in further query processing.

However, when data is shuffled using the above method, memory copying on the critical path will have a negative impact on performance. In addition, as the bandwidth of network cards continues to increase, in order to maximize the performance advantage of network card bandwidth, the CPU resources consumed by memory copying have become very considerable. For example, every 100 Gbps bandwidth requires about 5 CPU core resources to copy data.

In the process of solving the above technical problem, the inventors discovered through research that in order to avoid CPU consumption, the RDMA interface may be extended for the special data format of the row/column storage of the database system so that the self-developed network card can transfer data to a plurality of targets according to the user-defined distribution behavior after the DMA engine moves the data from the memory to the network card. A shuffling request parameter linked list may be generated based on at least one data to be shuffled in the host memory, in which the shuffling request parameter linked list is composed of shuffling request parameters corresponding to data segments to be sent to different target servers. Thereby, at least one data to be shuffled may be directly cached in a remote direct memory access network card based on the shuffling request parameter linked list. By merging the shuffling request parameters, the data corresponding to the plurality of shuffling request parameters merged may be sent at one time, and large-grained DMA reading and writing can make full use of PCIe performance.

Figure 2:
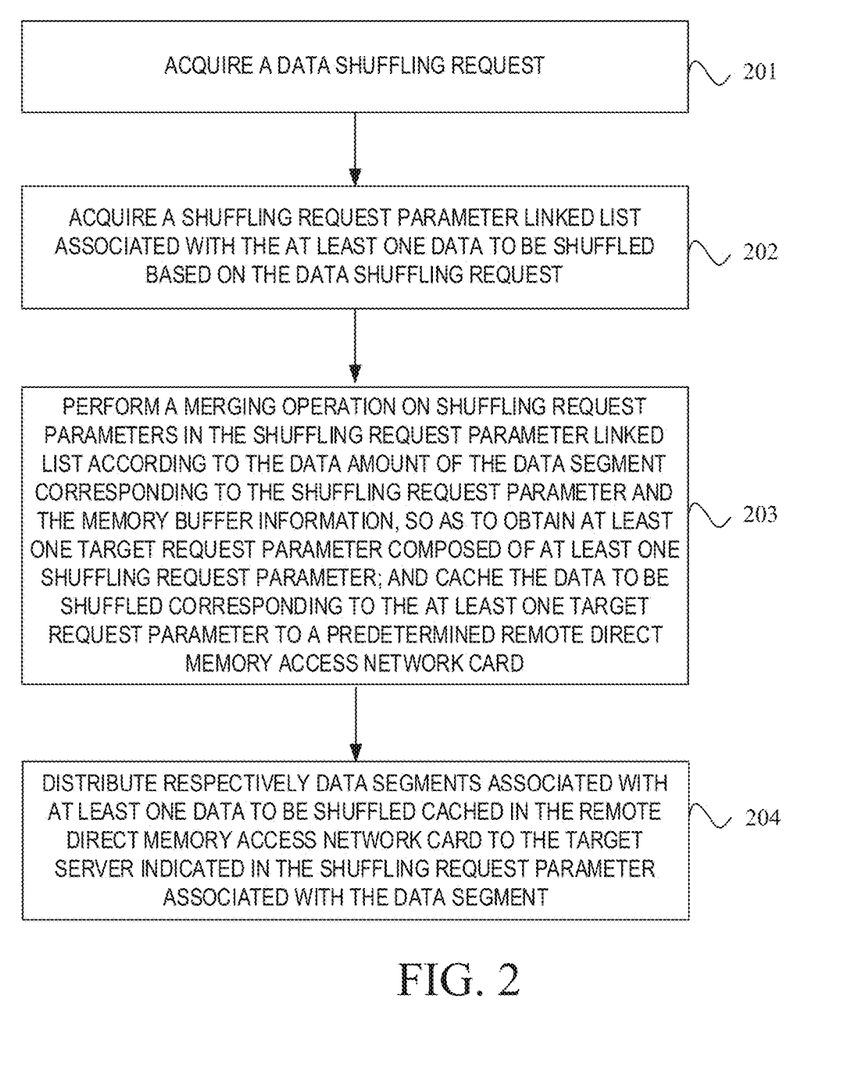
FIG. 2 is a schematic diagram of a flow chart of a method for data shuffling according to Embodiment 1 of the present disclosure.

FIG. 2 is a schematic diagram of a flow chart of a method for data shuffling according to Embodiment 1 of the present disclosure. As shown in FIG. 2, the method includes the following steps.

In step 201, acquiring a data shuffling request for distributing at least one data to be shuffled pre-stored in a host memory to at least one target server, and the data to be shuffled includes at least one data segment to be sent to different target servers.

The execution subject of this embodiment is an apparatus for data shuffling, and the apparatus for data shuffling may be coupled to a remote direct memory access network card.

In this embodiment, a data shuffling request may be acquired to send at least one data to be shuffled pre-stored in a host disk to different target servers respectively. Each data to be shuffled is composed of at least one data segment, in which different data segments may be sent to the same target server or to different target servers.

In step 202, acquiring a shuffling request parameter linked list associated with the at least one data to be shuffled based on the data shuffling request, wherein the shuffling request parameter linked list includes at least one shuffling request parameter corresponding to the at least one data segment, and the shuffling request parameter includes associated information of a target server to which the data segment is to be sent and memory buffer information corresponding to the data segment.

In this embodiment, during the data shuffling, the data to be shuffled stored in the host disk may be stored in the host memory.

In order to implement the data shuffling operation, a shuffling request parameter may be generated based on the data to be shuffled, in which the shuffling request parameter may be a work request (WR for short). Optionally, based on a data segment to be sent to the same target data server, a shuffling request parameter matching the data segment may be generated. That is, one data to be shuffled may correspond to at least one shuffling request parameter. The shuffling request parameter may include memory buffer information, associated information of the target server, and column index. The memory buffer information may specifically be starting addresses and lengths of several memory buffers (i.e., sg_list in the standard RDMA interface). The associated information of the target server may specifically be a starting address of a memory buffer for reception of the target server and a key for access (i.e., remote_addr and rkey in the standard RDMA interface). The same column indices will be put together by a load assembly engine to improve the compression rate.

Furthermore, a shuffling request parameter linked list may be generated based on shuffling request parameters corresponding to a plurality of data segments. After the data shuffling request is acquired, the shuffling request parameter linked list may be acquired.

In step 203, performing a merging operation on shuffling request parameters in the shuffling request parameter linked list according to the data amount of the data segment corresponding to the shuffling request parameter and the memory buffer information to obtain at least one target request parameter composed of at least one shuffling request parameter; and caching the data to be shuffled corresponding to the at least one target request parameter to a predetermined remote direct memory access network card.

In this embodiment, unlike the existing technical solution of copying a large amount of data using the CPU, after the shuffling request parameter linked list is acquired, at least one data to be shuffled in the host memory may be directly cached into a predetermined remote direct memory access network card based on the shuffling request parameter linked list, thereby avoiding copying a large amount of data and effectively saving CPU resources.

In actual applications, in the process of copying data with a direct memory access engine, if the amount of data copied each time is small, the PCIe performance will be consumed, resulting in low data shuffling efficiency. Therefore, in order to make full use of the PCIe function, when the shuffling request parameter linked list is acquired, the shuffling request parameters in the shuffling request parameter linked list may be optimized according to the data amount of the data segments corresponding to the shuffling request parameters and the memory buffer information to obtain at least one target request parameter, wherein the target request parameter is composed of at least one shuffling request parameter.

The optimization operation may be a merge operation, and at least one shuffling request parameter may be merged according to the data amount of the data segment corresponding to the shuffling request parameter and the memory buffer information to obtain a target request parameter composed of at least one shuffling request parameter.

Furthermore, the data to be shuffled corresponding to the at least one target request parameter may be cached in a remote direct memory access network card.

In step 204, distributing respectively data segments associated with at least one data to be shuffled cached in the remote direct memory access network card to the target server indicated in the shuffling request parameter associated with the data segment.

In this embodiment, since the shuffling request parameter associated with each data segment include associated information of the target server, when at least one data to be shuffled cached in the remote direct memory access network card meets a predetermined distribution condition, the data segments associated with at least one data to be shuffled cached in the remote direct memory access network card may be respectively distributed to target servers indicated in the shuffling request parameters associated with the data segments.

The predetermined distribution condition may be that the data amount in a cache queue reaches a predetermined data amount threshold.

Figure 3:
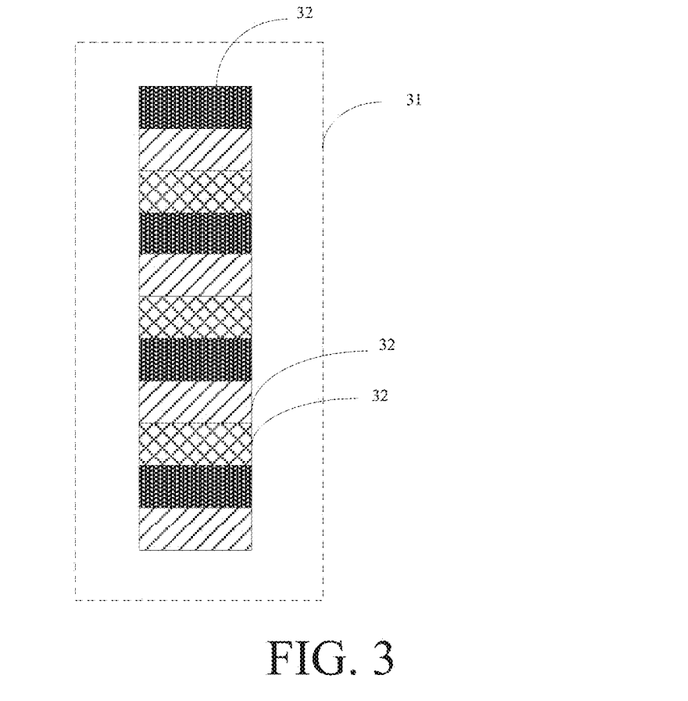
FIG. 3 is a schematic diagram of the structure of data to be shuffled according to an embodiment of the present disclosure.

FIG. 3 is a schematic diagram of the structure of the data to be shuffled according to an embodiment of the present disclosure. As shown in FIG. 3, the data to be shuffled 31 is a data column in a column storage format, in which each block 32 represents a segment of data, and data corresponding to data representing blocks with different backgrounds are sent to different target servers. When a shuffling request parameter is constructed, several data segments represented by blocks with the same background will generate a shuffling request parameter, and shuffling request parameters generated by blocks with a plurality of backgrounds will be connected in series in the form of a linked list to obtain a shuffling request parameter linked list.

In the date shuffling method according to this embodiment, a shuffling request parameter linked list is generated based on at least one data to be shuffled in a host memory, wherein the shuffling request parameter linked list is composed of shuffling request parameters corresponding to data segments to be sent to different target servers. The shuffling request parameters in the shuffling request parameter linked list are optimized to obtain at least one target request parameter, wherein the target request parameter is composed of at least one shuffling request parameter. Thus, at least one data to be shuffled may be directly cached in a remote direct memory access network card based on the at least one target request parameter. By merging the shuffling request parameters, it is possible to make full use of PCIe performance, improving the efficiency of data transmission. In addition, there is no need to perform a large number of memory copy operations, which effectively avoids a large amount of CPU resource consumption and avoids affecting CPU's performance.

Figure 4:
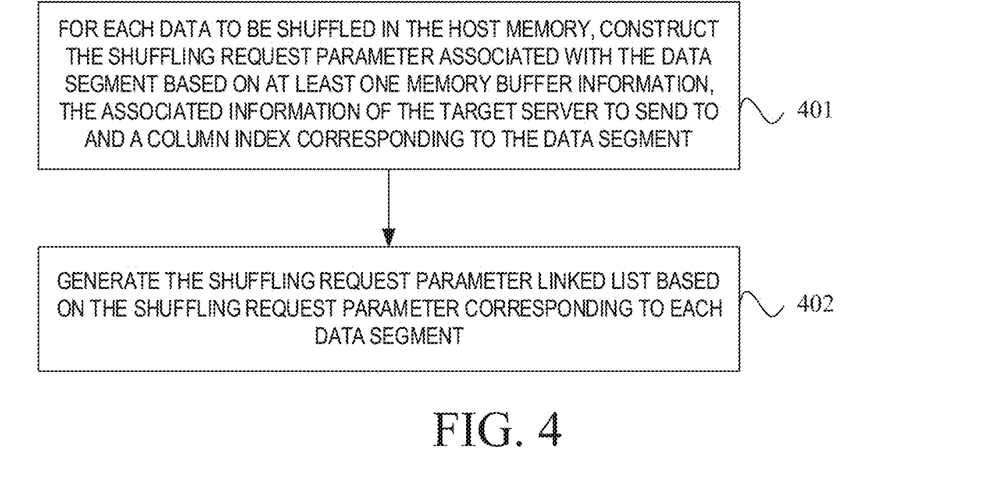
FIG. 4 is a schematic diagram of a flow chart of a method for data shuffling according to another embodiment of the present disclosure.

FIG. 4 is a schematic diagram of a flow chart of a method for data shuffling according to another embodiment of the present disclosure. Based on any of the above embodiments, as shown in FIG. 4, step 202 includes the following steps.

In step 401, for each data to be shuffled in the host memory, constructing the shuffling request parameter associated with the data segment based on at least one memory buffer information, the associated information of the target server to send to and a column index corresponding to the data segment.

In step 402, generating the shuffling request parameter linked list based on the shuffling request parameter corresponding to each data segment.

In this embodiment, before caching the data to be shuffled into an RDMA network card, the shuffling request parameter linked list needs to be created first.

Optionally, the data to be shuffled may be stored in a host disk, and the data to be shuffled in the host disk may be stored in a host memory. For each data to be shuffled in the host memory, a target server to send to corresponding to each data block in the data to be shuffled is determined, and at least one data block having the same target server to send to is determined as at least one data segment.

Furthermore, the shuffling request parameter associated with the data segment may be constructed based on at least one memory buffer information, associated information of the target server to send to, and column index corresponding to the data segment. The shuffling request parameter linked list is generated according to the shuffling request parameter corresponding to each data segment.

The memory buffer information may specifically be starting addresses and lengths of several memory buffers (i.e., sg_list in the standard RDMA interface). The associated information of the target server may specifically be a starting address of a memory buffer for reception of the target server and a key for access (i.e., remote_addr and rkey in the standard RDMA interface). The same column indices will be put together by a load assembly engine to improve the compression rate.

Further, based on any of the above embodiments, the shuffling request parameter further includes a pointer to the next shuffling request parameter.

In step 404, based on the pointer carried in each shuffling request parameter, generating the shuffling request parameter linked list according to the shuffling request parameter corresponding to each data segment.

In this embodiment, when constructing the shuffling request parameter according to the adopted shuffling rule, the RDMA interface may further carry a pointer to the next shuffling request parameter in the shuffling request parameter. Through the pointer, the shuffling request parameter corresponding to each data segment may be connected in series in the form of a linked list to obtain a shuffling request parameter linked list.

In the method for data shuffling according to this embodiment, shuffling request parameters may be generated based on data blocks sent to different target servers, and a shuffling request parameter linked list is generated based on the shuffling request parameters, so that the shuffling request parameters may be sent to an RDMA network card at one time, effectively reducing memory mapping I/O, thereby improving the efficiency of data shuffling.

Figure 5:
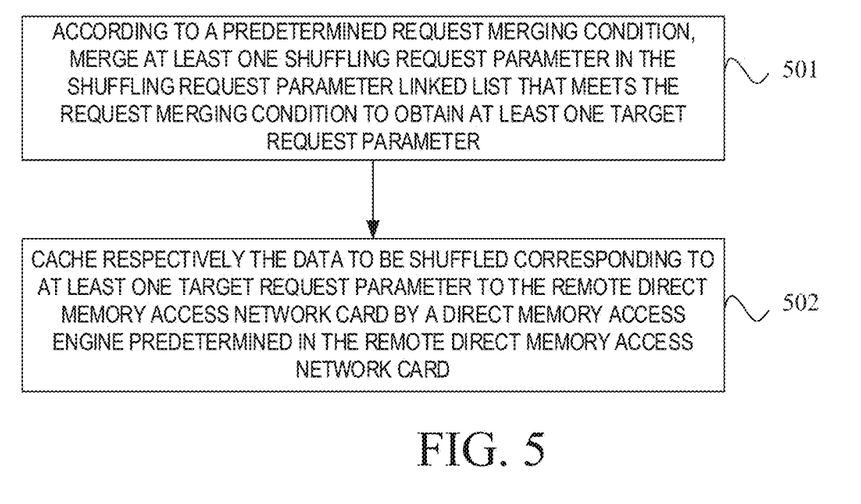
FIG. 5 is a schematic diagram of a flow chart of a method for data shuffling according to yet another embodiment of the present disclosure.

FIG. 5 is a schematic diagram of a flow chart of a method for data shuffling according to yet another embodiment of the present disclosure. Based on any of the above embodiments, as shown in FIG. 5, step 203 includes the following steps.

In step 501, according to a predetermined request merging condition, merging at least one shuffling request parameter in the shuffling request parameter linked list that meets the request merging condition to obtain at least one target request parameter.

In step 502, caching respectively the data to be shuffled corresponding to at least one target request parameter to the remote direct memory access network card by a direct memory access engine predetermined in the remote direct memory access network card.

In this embodiment, during the data copying with the direct memory access engine, if the amount of data copied each time is small, the PCIe performance will be consumed, resulting in low data shuffling efficiency.

Therefore, in order to make full use of the PCIe function, a shuffling request parameter optimizer may be pre-set in the remote direct memory access network card. The shuffling request parameter optimizer may, based on a predetermined request merging condition, merge at least one shuffling request parameter in the shuffling request parameter linked list that meets the request merging condition to obtain at least one target request parameter.

After the shuffling request parameters are optimized, the data to be shuffled corresponding to at least one target request parameter may be cached in the remote direct memory access network card by the direct memory access engine predetermined in the remote direct memory access network card, so that more data blocks may be transmitted with fewer network packets in a one-time data copy and data transmission process.

According to the method for data shuffling according to this embodiment, the network packets for data transmission can be reduced by merging at least one shuffling request parameter before transmitting the data to be shuffled to the RDMA network card, and transmission of a large range of continuous data blocks at one time can make full use of PCIe performance, improving the efficiency of data transmission.

Further, based on any of the above embodiments, the request merging condition includes merging shuffling request parameters whose data amount of data segments is less than a predetermined data amount threshold and which are continuous in the memory buffer. Step 501 includes:

for each shuffling request parameter in the shuffling request parameter linked list, detecting whether the data amount of the data segment corresponding to the shuffling request parameter is less than a predetermined data amount threshold.

At least two shuffling request parameters whose data amount is less than the predetermined data amount threshold and which are continuous in the memory buffer are merged to obtain at least one target request parameter.

In this embodiment, in order to make full use of the PCIe function, the predetermined request merging condition may specifically be to merge shuffling request parameters whose data amount of data segments is less than a predetermined data amount threshold and which are continuous in the memory buffer.

Therefore, for each shuffling request parameter in the shuffling request parameter linked list, it may be detected whether the data amount of the data segment corresponding to the shuffling request parameter is less than the predetermined data amount threshold. At least two shuffling request parameters whose data amount is less than the predetermined data amount threshold and which are continuous in the memory buffer are merged to obtain at least one target request parameter.

Figure 6:
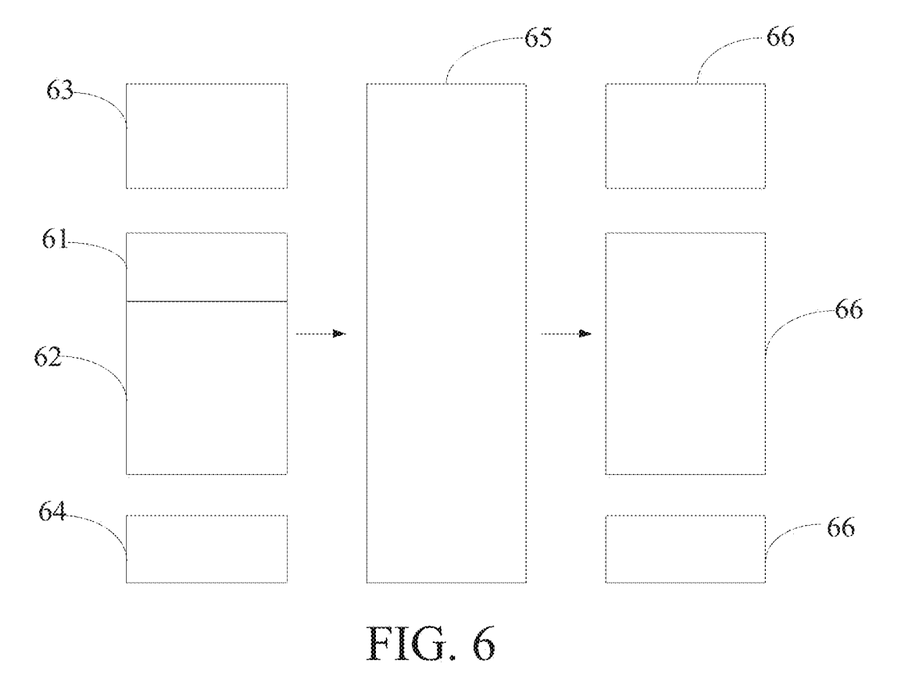
FIG. 6 is a schematic diagram of the structure of data to be shuffled according to an embodiment of the present disclosure.

FIG. 6 is a schematic diagram of the structure of the data to be shuffled according to an embodiment of the present disclosure. As shown in FIG. 6, an original shuffling request parameter includes four WRs, in which the second WR 61 and the third WR 62 are continuous in the memory, and are discontinuous with the first WR 63 and the fourth WR 64. During transmitting, the four WRs may be optimized to generate a large continuous area 65 for the DMA engine to copy the data once, and then the second WR 61 and the third WR 62 are merged, so that only three network packets 66 are finally generated for data transmission.

In the date shuffling method according to this embodiment, shuffling request parameters with a small amount of data are merged, thereby being able to transmit a large range of continuous data at one time, which makes full use of the PCIe performance and reduces the number of network packets sent.

Further, based on any of the above embodiments, after merging at least two shuffling request parameters whose data amount is less than a predetermined data amount threshold and are continuous in the memory buffer to obtain at least one target request parameter, the method further includes:

generating a descriptor of data copy for each target request parameter, wherein the descriptor includes data boundary information and data length information corresponding to each data segment associated with the target request parameter.

In this embodiment, when at least one data segment associated with the target request parameter is merged, an empty may be generated, wherein the empty may specifically be data that does not need to be sent.

Therefore, in order to accurately implement the data copy operation and avoid empty transmission, a descriptor of data copy is generated for each target request parameter, wherein the descriptor includes data boundary information and data length information corresponding to each data segment associated with the target request parameter.

Further, based on any of the above embodiments, step 402 includes:

copying the data to be shuffled from the host memory according to the target request parameter by the direct memory access engine.

The empties in the data to be shuffled are deleted based on the descriptor by a predetermined load assembly engine, and based on the target server in the target request parameter, the data to be sent to the same target server in the target request parameter is assembled to obtain assembled data.

The assembled data corresponding to at least one target request parameter is cached in a continuous cache area associated with each target server in the remote direct memory access network card.

In this embodiment, after the shuffling request parameters are optimized to obtain at least one target request parameter, the data to be shuffled may be copied from the host memory according to the descriptor associated with the target request parameter by the direct memory access engine.

Furthermore, since a descriptor of data copy is generated after the shuffling request parameters are merged, an empty in the data to be shuffled is deleted based on the descriptor by a predetermined load assembly engine. In addition, based on the target server in the target request parameter, the data to be sent to the same target server in the target request parameter may be assembled to obtain assembled data. The assembled data corresponding to at least one target request parameter is cached in a continuous cache area associated with each target server in the remote direct memory access network card.

In the date shuffling method according to this embodiment, a descriptor is generated after the shuffling request parameters are optimized, so that the DMA engine can accurately perform the data copy operation based on the descriptor. In addition, by generating the descriptor, the load assembly engine may also accurately eliminate the empties in the data based on the descriptor.

Figure 7:
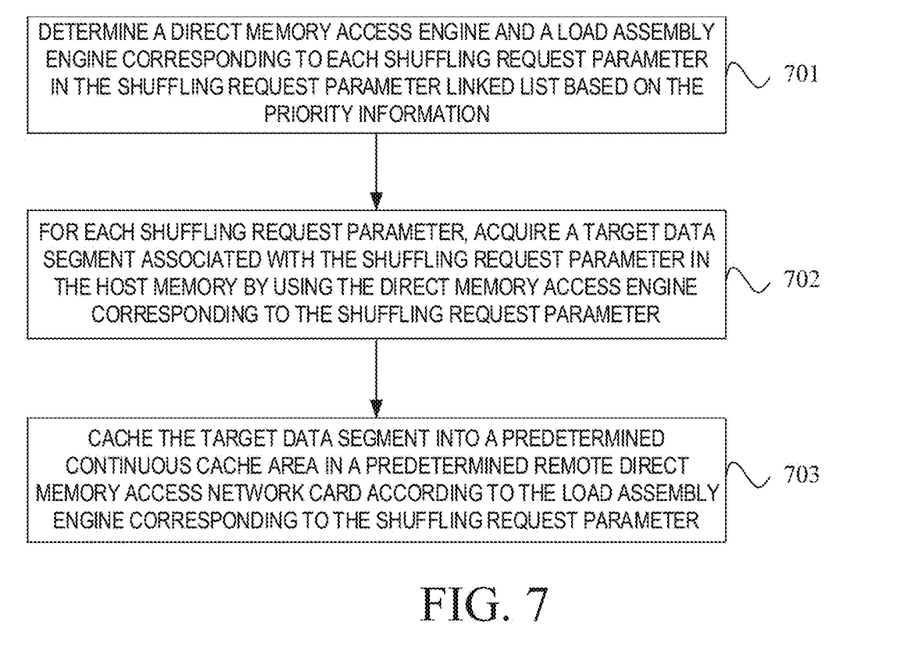
FIG. 7 is a schematic diagram of a flow chart of a method for data shuffling according to yet another embodiment of the present disclosure.

FIG. 7 is a schematic diagram of a flow chart of a method for data shuffling according to yet another embodiment of the present disclosure. Based on any of the above embodiments, the shuffling request parameter further includes predetermined priority information. As shown in FIG. 7, step 203 includes the following steps.

In step 701, determining a direct memory access engine and a load assembly engine corresponding to each shuffling request parameter in the shuffling request parameter linked list based on the priority information.

In step 702, for each shuffling request parameter, acquiring a target data segment associated with the shuffling request parameter in the host memory by using the direct memory access engine corresponding to the shuffling request parameter.

In step 703, caching the target data segment into a predetermined continuous cache area in a predetermined remote direct memory access network card according to the load assembly engine corresponding to the shuffling request parameter.

In this embodiment, in order to further improve the efficiency of data shuffling and enable the shuffling request parameters with high priority to be executed as quickly as possible, the shuffling request parameter may also carry priority information.

Specifically, the shuffling request parameter may include at least one memory buffer information, associated information of a target server to send to, column index and priority information corresponding to the data segment. Specifically, the memory buffer information may be starting addresses and lengths of several memory buffers (i.e., sg_list in the standard RDMA interface). The associated information of the target server may be a starting address of a memory buffer for reception of the target server and a key for access (i.e., remote_addr and rkey in the standard RDMA interface). The same column indices will be put together by the load assembly engine to improve the compression rate. The priority corresponding to the shuffling request parameter may be represented by numbers 0-3.

After the shuffling request parameter linked list is acquired, the direct memory access engine and the load assembly engine corresponding to each shuffling request parameter in the shuffling request parameter linked list may be determined based on the priority information. For each shuffling request parameter, a target data segment associated with the shuffling request parameter in a host memory is acquired by using the direct memory access engine corresponding to the shuffling request parameter. The target data segment is cached into a predetermined continuous cache area in a predetermined remote direct memory access network card according to the load assembly engine corresponding to the shuffling request parameter.

In addition, after the shuffling request parameters are acquired, the sending order may be rearranged based on the priorities carried by the shuffling request parameters and mapped to the network priority to support high-priority shuffling request parameters to be processed first and use high-priority queues and other resources on the network. For example, the priority of shuffling request parameter 1 is higher than that of shuffling request parameter 2, and when shuffling request parameter 1 and shuffling request parameter 2 are acquired respectively, shuffling request parameter 1 may be processed first. And on the network, shuffling request parameter 1 can use queues and other resources with a higher priority to achieve preferential processing of high-priority shuffling request parameters.

In the method for data shuffling according to this embodiment, a number of communication channels isolated according to priority are established, so that the query engine can use communication channels of different priorities according to the scheme of computing resource isolation, avoiding the performance jitter caused by network resource preemption, congestion and head-of-line blocking. The shuffling request parameter optimizer will re-sort the shuffling request parameters submitted by the user according to the priority and optimization rules, so that the high-priority shuffling request parameters may be executed as soon as possible.

Figure 8:
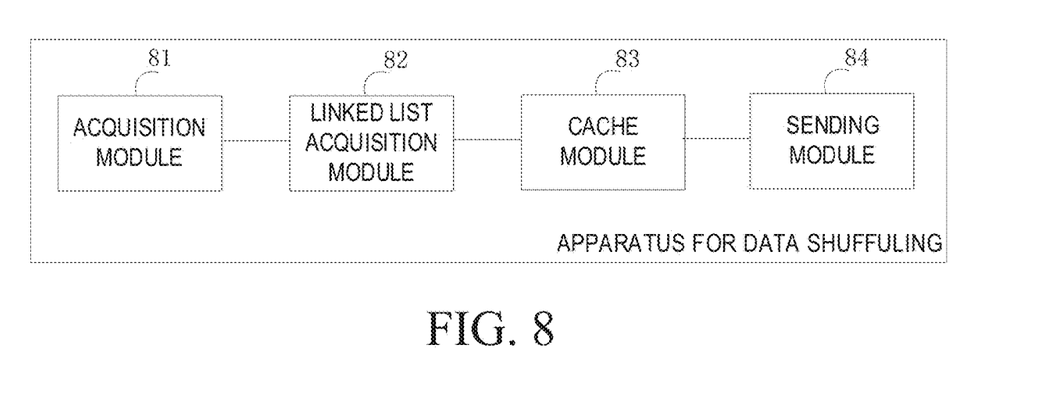
FIG. 8 is a schematic diagram of the structure of an apparatus for data shuffling according to an embodiment of the present disclosure.

FIG. 8 is a schematic diagram of the structure of an apparatus for data shuffling according to an embodiment of the present disclosure. As shown in FIG. 8, the apparatus includes: an acquisition module 81, a linked list acquisition module 82, a cache module 83, and a sending module 84. The acquisition module 81 is configured to acquire a data shuffling request, in which the data shuffling request is configured to distribute at least one data to be shuffled pre-stored in a host memory to at least one target server, and the data to be shuffled includes at least one data segment to be sent to different target servers. The linked list acquisition module 82 is configured to acquire a shuffling request parameter linked list associated with the at least one data to be shuffled according to the data shuffling request, wherein the shuffling request parameter linked list includes at least one shuffling request parameter corresponding to the at least one data segment, and the shuffling request parameter includes associated information of a target server to which the data segment is to be sent and memory buffer information corresponding to the data segment. The cache module 83 is configured to merge the shuffling request parameters in the shuffling request parameter linked list according to the data amount of the data segment corresponding to the shuffling request parameter and the memory buffer information to obtain at least one target request parameter composed of at least one shuffling request parameter; and to cache the data to be shuffled corresponding to the at least one target request parameter in a predetermined remote direct memory access network card. The sending module 84 is configured to distribute the data segment associated with at least one data to be shuffled cached in the remote direct memory access network card to the target server indicated in the shuffling request parameter associated with the data segment.

Further, based on any of the above embodiments, the linked list acquisition module is configured to: for each data to be shuffled in the host memory, construct the shuffling request parameter associated with the data segment based on at least one memory buffer information, associated information of the target server to send to, and column index corresponding to the data segment; and to generate the shuffling request parameter linked list according to the shuffling request parameter corresponding to each data segment.

Further, based on any of the above embodiments, the shuffling request parameter further includes a pointer to the next shuffling request parameter. The linked list acquisition module is configured to: generate the shuffling request parameter linked list according to the shuffling request parameter corresponding to each data segment based on the pointer carried in each shuffling request parameter.

Further, based on any of the above embodiments, the cache module is configured to: according to a predetermined request merging condition, merge at least one shuffling request parameter in the shuffling request parameter linked list that meets the request merging condition to obtain at least one target request parameter; and to cache the data to be shuffled corresponding to the at least one target request parameter into the remote direct memory access network card by a direct memory access engine predetermined in the remote direct memory access network card.

Further, based on any of the above embodiments, the request merging condition includes merging shuffling request parameters whose data amount of data segments is less than a predetermined data amount threshold and which are continuous in the memory buffer. The cache module is configured to: for each shuffling request parameter in the shuffling request parameter linked list, detect whether the data amount of the data segment corresponding to the shuffling request parameter is less than the predetermined data amount threshold; and to merge at least two shuffling request parameters whose data amount is less than the predetermined data amount threshold and which are continuous in the memory buffer to obtain at least one target request parameter.

Furthermore, based on any of the above embodiments, the apparatus also includes: a generating module configured to: generate a descriptor of data copy for each target request parameter, wherein the descriptor includes data boundary information and data length information corresponding to each data segment associated with the target request parameter.

Further, based on any of the above embodiments, the generating module is configured to: copy the data to be shuffled from the host memory according to the target request parameter by the direct memory access engine. An empty in the data to be shuffled is deleted based on the descriptor by a predetermined load assembly engine, and the data to be sent to the same target server in the target request parameter is assembled based on the target server in the target request parameter to obtain assembled data. The assembled data corresponding to at least one target request parameter is cached in a continuous cache area associated with each target server in the remote direct memory access network card.

Further, based on any of the above embodiments, the shuffling request parameters further include predetermined priority information. The cache module is configured to: determine the direct memory access engine and the load assembly engine corresponding to each shuffling request parameter in the shuffling request parameter linked list based on the priority information. For each shuffling request parameter, the target data segment associated with the shuffling request parameter in the host memory is acquired by using the direct memory access engine corresponding to the shuffling request parameter. The target data segment is cached into a predetermined continuous cache area in a predetermined remote direct memory access network card according to the load assembly engine corresponding to the shuffling request parameter.

The device according to the embodiment may be configured to implement the technical solutions of the above method embodiments. Its implementation principle and technical effect are similar, and will not be repeated here in this embodiment.

In order to implement the above embodiment, an electronic device is further provided according to an embodiment of the present disclosure. The electronic device includes a processor and a memory.

The memory stores computer-executable instructions.

The processor executes the computer-executable instructions stored in the memory, so that the processor performs the method for data shuffling as described in any of the above embodiments.

Figure 9:
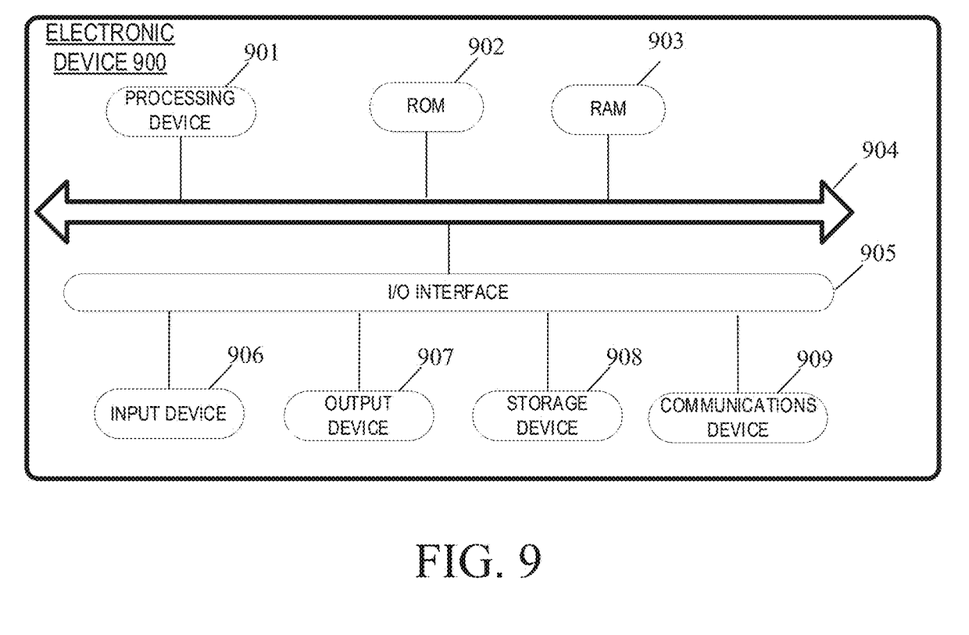
FIG. 9 is a schematic diagram of the structure of an electronic device according to an embodiment of the present disclosure.

FIG. 9 shows a schematic diagram of an electronic device according to an embodiment of the present disclosure. As shown in FIG. 9, the electronic device 900 may be a terminal device or a server. The terminal device may include but is not limited to a mobile terminal, such as a mobile phone, a notebook computer, a digital broadcast receiver, a personal digital assistant (PDA), a tablet computer (PAD), a portable multimedia player (PMP), an onboard terminal (such as an onboard navigation terminal), and a fixed terminal, such as a digital TV and a desktop computer. The electronic device shown in FIG. 9 is only an example, and should not limit the function and application range of the embodiments of the present disclosure.

As shown in FIG. 9, the electronic device 900 may include a processing apparatus (such as a central processing unit, a graphics processing unit, or the like) 901 that may perform various appropriate actions and processing according to a program stored in a read-only memory (ROM) 902 or a program loaded from a storage apparatus 908 into a random-access memory (RAM) 903. In the RAM 903, various programs and data required for operation of the electronic device are further stored. The processing apparatus 901, the ROM 902, and the RAM 903 are connected to each other by using a bus 904. An input/output (I/O) interface 905 is also connected to the bus 904.

Generally, the following apparatuses may be connected to the I/O interface 905: input apparatuses 906 including, for example, a touchscreen, a touchpad, a keyboard, a mouse, a camera, a microphone, an accelerometer, and a gyroscope; output apparatuses 907 including, for example, a liquid crystal display (LCD), a loudspeaker and a vibrator; storage apparatuses 908 including, for example, a tape or a hard disk; and a communications apparatus 909. The communications apparatus 909 may allow the electronic device to communicate wirelessly or wiredly with another device to exchange data. Although FIG. 9 shows an electronic device 900 with various apparatuses, it should be understood that it is not required to implement or provide all shown apparatuses. Alternatively, more or fewer apparatuses may be implemented or provided.

In particular, according to the embodiments of the present disclosure, the process described above with reference to the flowchart may be implemented as a computer software program. For example, an embodiment of the present disclosure includes a computer software program product that includes a computer program carried on a readable medium, and the computer program includes program codes used to perform the method shown in the flowchart. In such an embodiment, the computer program may be downloaded and installed from a network by using the communications apparatus 909, installed from the storage apparatus 908, or installed from the ROM 902. When the computer program is executed by the processing apparatus 901, the foregoing functions defined in the method in the embodiments of the present disclosure are executed.

It should be noted that the foregoing computer-readable medium in the present disclosure may be a computer-readable signal medium, a computer-readable storage medium, or any combination of the two. The computer-readable storage medium may be, for example, an electrical, magnetic, optical, electromagnetic, infrared, or semiconductor system, apparatus, or device, or any combination thereof. More specific examples of the computer-readable storage medium may include but are not limited to: an electrical connection having one or more conducting wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that includes or stores a program, and the program may be used by or in combination with an instruction execution system, apparatus, or device. In the present disclosure, the computer-readable signal medium may include a data signal propagated in a baseband or as a part of a carrier, which carries computer-readable program codes. Such a propagated data signal may be in multiple forms, including but not limited to an electromagnetic signal, an optical signal, or any suitable combination thereof. The computer-readable signal medium may further be any computer-readable medium other than the computer-readable storage medium, and the computer-readable signal medium may send, propagate, or transmit a program that is used by or in combination with an instruction execution system, apparatus, or device. The program code included in the computer-readable medium may be transmitted by using any suitable medium, including but not limited to: a wire, an optical cable, a radio frequency (RF), or any suitable combination thereof.

To realize the above embodiments, an embodiment of the present disclosure provides a computer-readable storage medium with computer-executable instructions stored therein. When the computer-executable instructions are executed by a processor, the method for data shuffling according to any one of the above embodiments is realized.

To realize the above embodiments, an embodiment of the present disclosure provides a computer program product including a computer program. When the computer program is executed, the method for data shuffling according to any one of the above embodiments is realized.

The computer-readable medium may be included in the foregoing electronic device, or may exist separately and not be assembled into the electronic device.

The computer-readable medium carries one or more programs, which causes the electronic device to execute the methods of the present disclosure when the one or more programs are executed by the electronic device.

Computer program codes for performing the operations of the present disclosure may be written in one or more programming languages or a combination thereof, such as object-oriented programming languages Java, Smalltalk, C++, and conventional procedural programming languages such as "C" or similar program design languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

Flowcharts and block diagrams in the accompanying drawings illustrate possible architectures, functions, and operations of systems, methods, and computer program products according to various embodiments of the present disclosure. In this regard, each block in a flowchart or block diagram may represent a module, program segment, or part of code that includes one or more executable instructions for implementing a specified logical function. It should also be noted that in some alternative implementations, functions marked in the block may also occur in different order than those marked in the accompanying drawings. For example, two blocks represented in succession may actually be executed in substantially parallel, and they may sometimes be executed in a reverse order, depending on the functions involved. It should also be noted that each block in the block diagram and/or flowchart and a combination of blocks in the block diagram and/or flowchart may be implemented by using a dedicated hardware-based system that performs a specified function or operation, or may be implemented by using a combination of dedicated hardware and a computer instruction.

The units described in embodiments of the present disclosure may be implemented either by means of software or by means of hardware. The names of these units do not limit the units themselves under certain circumstances. For example, the first acquiring unit may be described as "a unit configured for acquiring at least two inter-network protocol addresses".

Various functions described herein above can be implemented by one or more hardware logic members. For example and without limitations thereto, an exemplary hardware logic member includes a field programmable gate array (FPGA), an application-specific integrated circuit (ASIC), an application-specific standard product (ASSP), a system-on-chip system (SOC), a complex programmable logic device (CPLD) or the like.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatuses or devices, or any suitable combination of the foregoing. More specific examples of machine-readable storage media would include one or more wire-based electrical connections, portable computer disks, hard disks, random-access memories (RAMs), read-only memories (ROMs), erasable programmable read-only memories (EPROM or flash memories), fiber optics, portable compact disk read only memories (CD-ROMs), optical storage devices, magnetic storage devices, or any suitable combination of the foregoing.

In a first aspect, according to one or more embodiments of the present disclosure, a method for data shuffling is provided, comprising:
  acquiring a data shuffling request for distributing at least one data to be shuffled pre-stored in a host memory to at least one target server, wherein the data to be shuffled comprises at least one data segment to be sent to different target servers;
  acquiring a shuffling request parameter linked list associated with the at least one data to be shuffled based on the data shuffling request, wherein the shuffling request parameter linked list comprises at least one shuffling request parameter corresponding to the at least one data segment, and the shuffling request parameter comprises associated information of a target server to which the data segment is to be sent and memory buffer information corresponding to the data segment;
  performing a merging operation on shuffling request parameters in the shuffling request parameter linked list according to the data amount of the data segment corresponding to the shuffling request parameter and the memory buffer information to obtain at least one target request parameter composed of at least one shuffling request parameter; and caching the data to be shuffled corresponding to the at least one target request parameter to a predetermined remote direct memory access network card;
  distributing respectively data segments associated with at least one data to be shuffled cached in the remote direct memory access network card to the target server indicated in the shuffling request parameters associated with the data segment.

According to one or more embodiments of the present disclosure, acquiring a shuffling request parameter linked list associated with at least one data to be shuffled in the host memory, comprises:

for each data to be shuffled in the host memory, constructing the shuffling request parameter associated with the data segment based on at least one memory buffer information, the associated information of the target server to send to and a column index corresponding to the data segment;

generating the shuffling request parameter linked list according to the shuffling request parameter corresponding to each data segment.

According to one or more embodiments of the present disclosure, the shuffling request parameter further comprises a pointer to a next shuffling request parameter;

generating the shuffling request parameter linked list according to the shuffling request parameter corresponding to each data segment comprises:

based on the pointer carried in each shuffling request parameter, generating the shuffling request parameter linked list according to the shuffling request parameter corresponding to each data segment.

According to one or more embodiments of the present disclosure, performing a merging operation on shuffling request parameters in the shuffling request parameter linked list to obtain at least one target request parameter composed of at least one shuffling request parameter; and caching the data to be shuffled corresponding to the at least one target request parameter to the predetermined remote direct memory access network card, comprise:

according to a predetermined request merging condition, performing the merging operation on at least one shuffling request parameter in the shuffling request parameter linked list that meets the request merging condition to obtain at least one target request parameter;

caching respectively the data to be shuffled corresponding to at least one target request parameter to the remote direct memory access network card by a direct memory access engine predetermined in the remote direct memory access network card.

According to one or more embodiments of the present disclosure, the request merging condition comprises merging the shuffling request parameters whose data amount of the data segment is less than a predetermined data amount threshold and which are continuous on the memory buffer;

merging the shuffling request parameters in the shuffling request parameter linked list according to the data amount of the data segment corresponding to the shuffling request parameter and the memory buffer information, comprises:

for each shuffling request parameter in the shuffling request parameter linked list, detecting whether the data amount of the data segment corresponding to the shuffling request parameter is less than the predetermined data amount threshold; and merging at least two shuffling request parameters whose data amount is less than the predetermined data amount threshold and which are continuous on the memory buffer to obtain at least one target request parameter.

According to one or more embodiments of the present disclosure, merging at least two shuffling request parameters whose data amount is less than the predetermined data amount threshold and which are continuous on the memory buffer to obtain at least one target request parameter, further comprises:

for each target request parameter, generating a descriptor of data copy, wherein the descriptor comprises data boundary information and data length information corresponding to each data segment associated with the target request parameter.

According to one or more embodiments of the present disclosure, caching respectively the data to be shuffled corresponding to at least one target request parameter to the remote direct memory access network card by a direct memory access engine predetermined in the remote direct memory access network card, comprises:

copying the data to be shuffled from the host memory according to the target request parameters by the direct memory access engine;

deleting empties in the data to be shuffled based on the descriptor by a predetermined load assembly engine, and assembling data to be sent to the same target server in the target request parameter based on the target server in the target request parameter to obtain assembled data; and caching respectively the assembled data corresponding to at least one target request parameter to a continuous cache area associated with each target server in the remote direct memory access network card.

According to one or more embodiments of the present disclosure, the shuffling request parameter further comprises predetermined priority information;

caching the data to be shuffled corresponding to the at least one target request parameter to the predetermined remote direct memory access network card, comprises:

determining the direct memory access engine and the load assembly engine corresponding to each shuffling request parameter in the shuffling request parameter linked list based on the priority information;

for each shuffling request parameter, acquiring a target data segment associated with the shuffling request parameter in the host memory by using the direct memory access engine corresponding to the shuffling request parameter; and caching the target data segment to the continuous cache area predetermined in the predetermined remote direct memory access network card by the load assembly engine corresponding to the shuffling request parameter.

In a second aspect, according to one or more embodiments of the present disclosure, an apparatus for data shuffling is provided, comprising:

an acquisition module configured to acquire a data shuffling request for distributing at least one data to be shuffled pre-stored in a host memory to at least one target server, wherein the data to be shuffled comprises at least one data segment to be sent to different target servers;

a linked list acquisition module configured to acquire a shuffling request parameter linked list associated with the at least one data to be shuffled based on the data shuffling request, wherein the shuffling request parameter linked list comprises at least one shuffling request parameter corresponding to the at least one data segment, and the shuffling request parameter comprises associated information of a target server to which the data segment is to be sent and memory buffer information corresponding to the data segment;

a cache module configured to perform a merging operation on shuffling request parameters in the shuffling request parameter linked list according to the data amount of the data segment corresponding to the shuffling request parameter and the memory buffer information to obtain at least one target request parameter composed of at least one shuffling request parameter; and caching the data to be shuffled corresponding to the at least one target request parameter to a predetermined remote direct memory access network card; and a sending module configured to distribute respectively data segments associated with at least one data to be shuffled cached in the remote direct memory access network card to the target server indicated in the shuffling request parameter associated with the data segment.

According to one or more embodiments of the present disclosure, the linked list acquisition module is configured to:

for each data to be shuffled in the host memory, construct the shuffling request parameter associated with the data segment based on at least one memory buffer information, the associated information of the target server to send to and a column index corresponding to the data segment; and generate the shuffling request parameter linked list according to the shuffling request parameter corresponding to each data segment.

According to one or more embodiments of the present disclosure, the shuffling request parameter further comprises a pointer to a next shuffling request parameter;

the linked list acquisition module is configured to:

based on the pointer carried in each shuffling request parameter, generate the shuffling request parameter linked list according to the shuffling request parameter corresponding to each data segment.

According to one or more embodiments of the present disclosure, the cache module is configured to:

according to a predetermined request merging condition, perform a merging operation on at least one shuffling request parameter in the shuffling request parameter linked list that meets the request merging condition to obtain at least one target request parameter; and cache respectively the data to be shuffled corresponding to at least one target request parameter to the remote direct memory access network card by a direct memory access engine predetermined in the remote direct memory access network card.

According to one or more embodiments of the present disclosure, the request merging condition comprises merging the shuffling request parameters whose data amount of the data segment is less than a predetermined data amount threshold and which are continuous on the memory buffer; and the cache module is configured to:

for each shuffling request parameter in the shuffling request parameter linked list, detect whether the data amount of the data segment corresponding to the shuffling request parameter is less than the predetermined data amount threshold; and merge at least two shuffling request parameters whose data amount is less than the predetermined data amount threshold and which are continuous on the memory buffer to obtain at least one target request parameter.

According to one or more embodiments of the present disclosure, the apparatus further comprises: a generating module configured to:

for each target request parameter, generate a descriptor of data copy, wherein the descriptor comprises data boundary information and data length information corresponding to each data segment associated with the target request parameter.

According to one or more embodiments of the present disclosure, the generating module is configured to:

copy the data to be shuffled from the host memory according to the target request parameters by the direct memory access engine;

delete empties in the data to be shuffled based on the descriptor by a predetermined load assembly engine, and assemble data to be sent to the same target server in the target request parameter based on the target server in the target request parameter to obtain assembled data;

Cache respectively the assembled data corresponding to at least one target request parameter to the continuous cache area associated with each target server in the remote direct memory access network card.

According to one or more embodiments of the present disclosure, the shuffling request parameter further comprises predetermined priority information;

the cache module is configured to:

determine the direct memory access engine and the load assembly engine corresponding to each shuffling request parameter in the shuffling request parameter linked list based on the priority information;

for each shuffling request parameter, use the direct memory access engine corresponding to the shuffling request parameter to acquire a target data segment associated with the shuffling request parameter in the host memory;

cache the target data segment to the continuous cache area predetermined in the predetermined remote direct memory access network card by the load assembly engine corresponding to the shuffling request parameter.

In a third aspect, according to one or more embodiments of the present disclosure, an electronic device is provided, comprising at least one processor and one memory;

the memory stores computer-executable instructions;

the at least one processor executes computer-executable instructions stored in the memory to enable at least one processor to execute the method for data shuffling as described in the first aspect and various possible designs of the first aspect.

In a fourth aspect, according to one or more embodiments of the present disclosure, a computer-readable storage medium is provided, wherein the computer-readable storage medium stores computer-executable instructions which, when executed by a processor, carry out the method for data shuffling as described in the first aspect and various possible designs of the first aspect.

In a fifth aspect, according to one or more embodiments of the present disclosure, a computer program product is provided, comprising a computer program which, when executed by a processor, carries out the method for data shuffling as described in the first aspect and various possible designs of the first aspect.

The above only describes preferred embodiments of the present disclosure and is an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept, for example, a technical solution formed by interchanging the above features with (but not limited to) technical features with similar functions disclosed in the present disclosure.

Furthermore, while the operations are depicted using a particular order, this should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logical actions, it should be understood that the subject matter limited in the appended claims is not necessarily limited to the particular features or actions described above. Rather, the particular features and actions described above are merely example forms of implementing the claims.

What is claimed is:

1. A method for data shuffling, comprising:
   acquiring a data shuffling request for distributing at least one data to be shuffled pre-stored in a host memory to at least one target server, wherein the data to be shuffled comprises at least one data segment to be sent to different target servers;
   acquiring a shuffling request parameter linked list associated with the at least one data to be shuffled based on the data shuffling request, wherein the shuffling request parameter linked list comprises at least one shuffling request parameter corresponding to the at least one data segment, and the shuffling request parameter comprises associated information of a target server to which the data segment is to be sent and memory buffer information corresponding to the data segment;
   performing a merging operation on shuffling request parameters in the shuffling request parameter linked list according to the data amount of the data segment corresponding to the shuffling request parameter and the memory buffer information to obtain at least one target request parameter composed of at least one shuffling request parameter; and caching the data to be shuffled corresponding to the at least one target request parameter to a predetermined remote direct memory access network card; and
   distributing respectively data segments associated with at least one data to be shuffled cached in the remote direct memory access network card to the target server indicated in the shuffling request parameter associated with the data segment.

2. The method of claim 1, wherein the acquiring a shuffling request parameter linked list associated with at least one data to be shuffled in the host memory, comprises:
   for each data to be shuffled in the host memory, constructing the shuffling request parameter associated with the data segment based on at least one memory buffer information, the associated information of the target server to send to and a column index corresponding to the data segment; and
   generating the shuffling request parameter linked list based on the shuffling request parameter corresponding to each data segment.

3. The method of claim 2, wherein the shuffling request parameter further comprises a pointer to a next shuffling request parameter;
   generating the shuffling request parameter linked list according to the shuffling request parameter corresponding to each data segment, comprises:
   based on the pointer carried in each shuffling request parameter, generating the shuffling request parameter linked list according to the shuffling request parameter corresponding to each data segment.

4. The method of claim 1, wherein performing a merging operation on shuffling request parameters in the shuffling request parameter linked list to obtain at least one target request parameter composed of at least one shuffling request parameter; and caching the data to be shuffled corresponding to the at least one target request parameter to the predetermined remote direct memory access network card, comprises:
   according to a predetermined request merging condition, merging at least one shuffling request parameter in the shuffling request parameter linked list that meets the request merging condition to obtain at least one target request parameter; and
   caching respectively the data to be shuffled corresponding to at least one target request parameter to the remote direct memory access network card by a direct memory access engine predetermined in the remote direct memory access network card.

5. The method of claim 4, wherein the request merging condition comprises merging the shuffling request parameters whose data amount of the data segment is less than a predetermined data amount threshold and which are continuous on the memory buffer;
   merging the shuffling request parameters in the shuffling request parameter linked list according to the data amount of the data segment corresponding to the shuffling request parameter and the memory buffer information, comprises:
   for each shuffling request parameter in the shuffling request parameter linked list, detecting whether the data amount of the data segment corresponding to the shuffling request parameter is less than the predetermined data amount threshold; and
   merging at least two shuffling request parameters whose data amount is less than the predetermined data amount threshold and which are continuous on the memory buffer to obtain at least one target request parameter.

6. The method of claim 5, wherein the merging at least two shuffling request parameters whose data amount is less than the predetermined data amount threshold and which are continuous on the memory buffer to obtain at least one target request parameter, further comprises:
   for each target request parameter, generating a descriptor of data copy, wherein the descriptor comprises data boundary information and data length information corresponding to each data segment associated with the target request parameter.

7. The method of claim 6, wherein caching respectively the data to be shuffled corresponding to at least one target request parameter to the remote direct memory access network card by a direct memory access engine predetermined in the remote direct memory access network card, comprises:

copying the data to be shuffled from the host memory according to the target request parameters by the direct memory access engine;
deleting empties in the data to be shuffled based on the descriptor by a predetermined load assembly engine, and assembling data to be sent to the same target server in the target request parameter based on the target server in the target request parameter to obtain assembled data; and
caching respectively the assembled data corresponding to at least one target request parameter to the continuous cache area associated with each target server in the remote direct memory access network card.

8. The method of claim 1, wherein the shuffling request parameter further comprises predetermined priority information;
caching the data to be shuffled corresponding to the at least one target request parameter to the predetermined remote direct memory access network card, comprises:
determining the direct memory access engine and the load assembly engine corresponding to each shuffling request parameter in the shuffling request parameter linked list based on the priority information;
for each shuffling request parameter, acquiring a target data segment associated with the shuffling request parameter in the host memory by using the direct memory access engine corresponding to the shuffling request parameter; and
caching the target data segment to the continuous cache area predetermined in the predetermined remote direct memory access network card according to the load assembly engine corresponding to the shuffling request parameter.

9. An electronic device, comprising a processor and a memory;
the memory stores computer-executable instructions;
the processor executes computer-executable instructions stored in the memory, to cause the processor to carry out a method for data shuffling, comprising:
acquiring a data shuffling request for distributing at least one data to be shuffled pre-stored in a host memory to at least one target server, wherein the data to be shuffled comprises at least one data segment to be sent to different target servers;
acquiring a shuffling request parameter linked list associated with the at least one data to be shuffled based on the data shuffling request, wherein the shuffling request parameter linked list comprises at least one shuffling request parameter corresponding to the at least one data segment, and the shuffling request parameter comprises associated information of a target server to which the data segment is to be sent and memory buffer information corresponding to the data segment;
performing a merging operation on shuffling request parameters in the shuffling request parameter linked list according to the data amount of the data segment corresponding to the shuffling request parameter and the memory buffer information to obtain at least one target request parameter composed of at least one shuffling request parameter; and caching the data to be shuffled corresponding to the at least one target request parameter to a predetermined remote direct memory access network card; and
distributing respectively data segments associated with at least one data to be shuffled cached in the remote direct memory access network card to the target server indicated in the shuffling request parameter associated with the data segment.

10. The electronic device of claim 9, wherein the acquiring a shuffling request parameter linked list associated with at least one data to be shuffled in the host memory, comprises:
for each data to be shuffled in the host memory, constructing the shuffling request parameter associated with the data segment based on at least one memory buffer information, the associated information of the target server to send to and a column index corresponding to the data segment; and
generating the shuffling request parameter linked list based on the shuffling request parameter corresponding to each data segment.

11. The electronic device of claim 10, wherein the shuffling request parameter further comprises a pointer to a next shuffling request parameter;
generating the shuffling request parameter linked list according to the shuffling request parameter corresponding to each data segment, comprises:
based on the pointer carried in each shuffling request parameter, generating the shuffling request parameter linked list according to the shuffling request parameter corresponding to each data segment.

12. The electronic device of claim 9, wherein performing a merging operation on shuffling request parameters in the shuffling request parameter linked list obtain at least one target request parameter composed of at least one shuffling request parameter; and caching the data to be shuffled corresponding to the at least one target request parameter to the predetermined remote direct memory access network card, comprises:
according to a predetermined request merging condition, merging at least one shuffling request parameter in the shuffling request parameter linked list that meets the request merging condition to obtain at least one target request parameter; and
caching respectively the data to be shuffled corresponding to at least one target request parameter to the remote direct memory access network card by a direct memory access engine predetermined in the remote direct memory access network card.

13. The electronic device of claim 12, wherein the request merging condition comprises merging the shuffling request parameters whose data amount of the data segment is less than a predetermined data amount threshold and which are continuous on the memory buffer;
merging the shuffling request parameters in the shuffling request parameter linked list according to the data amount of the data segment corresponding to the shuffling request parameter and the memory buffer information, comprises:
for each shuffling request parameter in the shuffling request parameter linked list, detecting whether the data amount of the data segment corresponding to the shuffling request parameter is less than the predetermined data amount threshold; and
merging at least two shuffling request parameters whose data amount is less than the predetermined data amount threshold and which are continuous on the memory buffer to obtain at least one target request parameter.

14. The electronic device of claim 13, wherein the merging at least two shuffling request parameters whose data amount is less than the predetermined data amount threshold and which are continuous on the memory buffer to obtain at least one target request parameter, further comprises:
for each target request parameter, generating a descriptor of data copy, wherein the descriptor comprises data boundary information and data length information corresponding to each data segment associated with the target request parameter.

15. The electronic device of claim 14, wherein caching respectively the data to be shuffled corresponding to at least one target request parameter to the remote direct memory access network card by a direct memory access engine predetermined in the remote direct memory access network card, comprises:
copying the data to be shuffled from the host memory according to the target request parameters by the direct memory access engine;
deleting empties in the data to be shuffled based on the descriptor by a predetermined load assembly engine, and assembling data to be sent to the same target server in the target request parameter based on the target server in the target request parameter to obtain assembled data; and
caching respectively the assembled data corresponding to at least one target request parameter to the continuous cache area associated with each target server in the remote direct memory access network card.

16. The electronic device of claim 9, wherein the shuffling request parameter further comprises predetermined priority information;
caching the data to be shuffled corresponding to the at least one target request parameter to the predetermined remote direct memory access network card, comprises:
determining the direct memory access engine and the load assembly engine corresponding to each shuffling request parameter in the shuffling request parameter linked list based on the priority information;
for each shuffling request parameter, acquiring a target data segment associated with the shuffling request parameter in the host memory by using the direct memory access engine corresponding to the shuffling request parameter; and
caching the target data segment to the continuous cache area predetermined in the predetermined remote direct memory access network card according to the load assembly engine corresponding to the shuffling request parameter.

17. A non-transitory computer-readable storage medium, wherein the computer-readable storage medium stores computer-executable instructions which, when executed by a processor, carry out a method for data shuffling comprising:
acquiring a data shuffling request for distributing at least one data to be shuffled pre-stored in a host memory to at least one target server, wherein the data to be shuffled comprises at least one data segment to be sent to different target servers;
acquiring a shuffling request parameter linked list associated with the at least one data to be shuffled based on the data shuffling request, wherein the shuffling request parameter linked list comprises at least one shuffling request parameter corresponding to the at least one data segment, and the shuffling request parameter comprises associated information of a target server to which the data segment is to be sent and memory buffer information corresponding to the data segment;
performing a merging operation on shuffling request parameters in the shuffling request parameter linked list according to the data amount of the data segment corresponding to the shuffling request parameter and the memory buffer information to obtain at least one target request parameter composed of at least one shuffling request parameter; and caching the data to be shuffled corresponding to the at least one target request parameter to a predetermined remote direct memory access network card; and
distributing respectively data segments associated with at least one data to be shuffled cached in the remote direct memory access network card to the target server indicated in the shuffling request parameter associated with the data segment.

18. The non-transitory computer-readable storage medium of claim 17, wherein the acquiring a shuffling request parameter linked list associated with at least one data to be shuffled in the host memory, comprises:
for each data to be shuffled in the host memory, constructing the shuffling request parameter associated with the data segment based on at least one memory buffer information, the associated information of the target server to send to and a column index corresponding to the data segment; and
generating the shuffling request parameter linked list based on the shuffling request parameter corresponding to each data segment.

19. The non-transitory computer-readable storage medium of claim 18, wherein the shuffling request parameter further comprises a pointer to a next shuffling request parameter;
generating the shuffling request parameter linked list according to the shuffling request parameter corresponding to each data segment, comprises:
based on the pointer carried in each shuffling request parameter, generating the shuffling request parameter linked list according to the shuffling request parameter corresponding to each data segment.

20. The non-transitory computer-readable storage medium of claim 17, wherein performing a merging operation on shuffling request parameters in the shuffling request parameter linked list to obtain at least one target request parameter composed of at least one shuffling request parameter; and caching the data to be shuffled corresponding to the at least one target request parameter to the predetermined remote direct memory access network card, comprises:
according to a predetermined request merging condition, merging at least one shuffling request parameter in the shuffling request parameter linked list that meets the request merging condition to obtain at least one target request parameter; and
caching respectively the data to be shuffled corresponding to at least one target request parameter to the remote direct memory access network card by a direct memory access engine predetermined in the remote direct memory access network card.

* * * * *